(12) United States Patent
Ogino et al.

(10) Patent No.: US 6,941,145 B2
(45) Date of Patent: Sep. 6, 2005

(54) RADIO COMMUNICATION TERMINAL AND POSITION SPECIFYING SYSTEM

(75) Inventors: Hiroyasu Ogino, Okazaki (JP);
Toshihiro Takeuchi, Tokoname (JP);
Michio Shamoto, Niwa-gun (JP)

(73) Assignee: Denso Corporation, Kariya (JP)

( * ) Notice: Subject to any disclaimer, the term of this patent is extended or adjusted under 35 U.S.C. 154(b) by 476 days.

(21) Appl. No.: 10/215,023

(22) Filed: Aug. 9, 2002

(65) Prior Publication Data

US 2003/0100313 A1 May 29, 2003

(30) Foreign Application Priority Data

Nov. 28, 2001 (JP) ........................................ 2001-362523

(51) Int. Cl.[7] ................................................ H04Q 7/20
(52) U.S. Cl. ................................ 455/456.1; 455/456.5; 455/456.6
(58) Field of Search .......................... 455/456.1, 456.5, 455/456.6, 457, 67.11

(56) References Cited

U.S. PATENT DOCUMENTS 6,266,534 B1 * 7/2001 Raith et al. ............... 455/456.3
6,313,786 B1 * 11/2001 Sheynblat et al. ...... 342/357.02
6,323,804 B1 * 11/2001 Kurby et al. ........... 342/357.06
6,658,258 B1 * 12/2003 Chen et al. ............... 455/456.1
2002/0168988 A1 * 11/2002 Younis ........................ 455/456

FOREIGN PATENT DOCUMENTS

| JP | A 8-262122 | 10/1996 |
| JP | A 11-239381 | 8/1999 |
| WO | WO 00/36431 | 6/2000 |

* cited by examiner

*Primary Examiner*—Sonny Trinh
*Assistant Examiner*—Un C Cho
(74) *Attorney, Agent, or Firm*—Oliff & Berridge, PLC

(57) ABSTRACT

A radio communication terminal is used in a position specifying system, in which both retrieval timing and retrieval time of each of GPS satellites are received via a communication base station from a position information server. The position information server specifies a position of the radio communication terminal based upon at least GPS satellite information received from the radio communication terminal. The radio communication terminal corrects at least any one of both retrieval timing and retrieval time so that the retrieval timing is moved, or the retrieval time is prolonged. The radio communication terminal retrieves the GPS satellites based upon the corrected retrieval timing and the corrected retrieval time.

15 Claims, 14 Drawing Sheets

FIG. 5

| SAT. NO. | ELEV. (°) | CODE PHASE | SEARCH WINDOW |
|---|---|---|---|
| 5 | 45 | 86 | 80 |
| 22 | 70 | 624 | 2 |
| 6 | 35 | 155 | 28 |
| 4 | 75 | 30 | 4 |
| 31 | 50 | 811 | 65 |
| 8 | 55 | 24 | 28 |
| 17 | 60 | 256 | 4 |
| 27 | 30 | 334 | 10 |

FIG. 6

| INDEX | SAT. NO. | ELEV. (°) | CODE PHASE | SEARCH WINDOW |
|---|---|---|---|---|
| 1 | 4 | 75 | 30 | 4 |
| 2 | 22 | 70 | 624 | 2 |
| 3 | 17 | 60 | 256 | 4 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

FIG. 7

| SEARCH WINDOW | RETRIEVAL TIME (ms) |
|---|---|
| 0~31 | 10 |
| 32~63 | 20 |
| 64~95 | 30 |
| 96~127 | 40 |
| 128~159 | 50 |
| 160~191 | 60 |
| 192~223 | 70 |
| 224~ | 80 |
| ⋮ | ⋮ |
| ~1023 | |

FIG. 8

| INDEX | SAT. NO. | ELEV. (°) | CODE PHASE | SEARCH WINDOW |
|---|---|---|---|---|
| 1 | 4 | 75 | 30 | 80 |
| 2 | 22 | 70 | 624 | 2 |
| 3 | 17 | 60 | 256 | 4 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

SEARCH WINDOW EXTENSION (4→80)

FIG. 10

| INDEX | SAT. NO. | ELEV. (°) | CODE PHASE | SEARCH WINDOW |
|---|---|---|---|---|
| 1 | 4 | 75 | 30 | → 50 |
| 2 | 22 | 70 | 624 | 2 |
| 3 | 17 | 60 | 256 | 4 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

PARAMETER CORRECTION (4→50)

FIG. 12

| INDEX | SAT. NO. | ELEV. (°) | CODE PHASE | SEARCH WINDOW |
|---|---|---|---|---|
| 1 | 4 | 75 | → 20 | 4 |
| 2 | 22 | 70 | 624 | 2 |
| 3 | 17 | 60 | 256 | 4 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

PARAMETER CORRECTION (30→20)

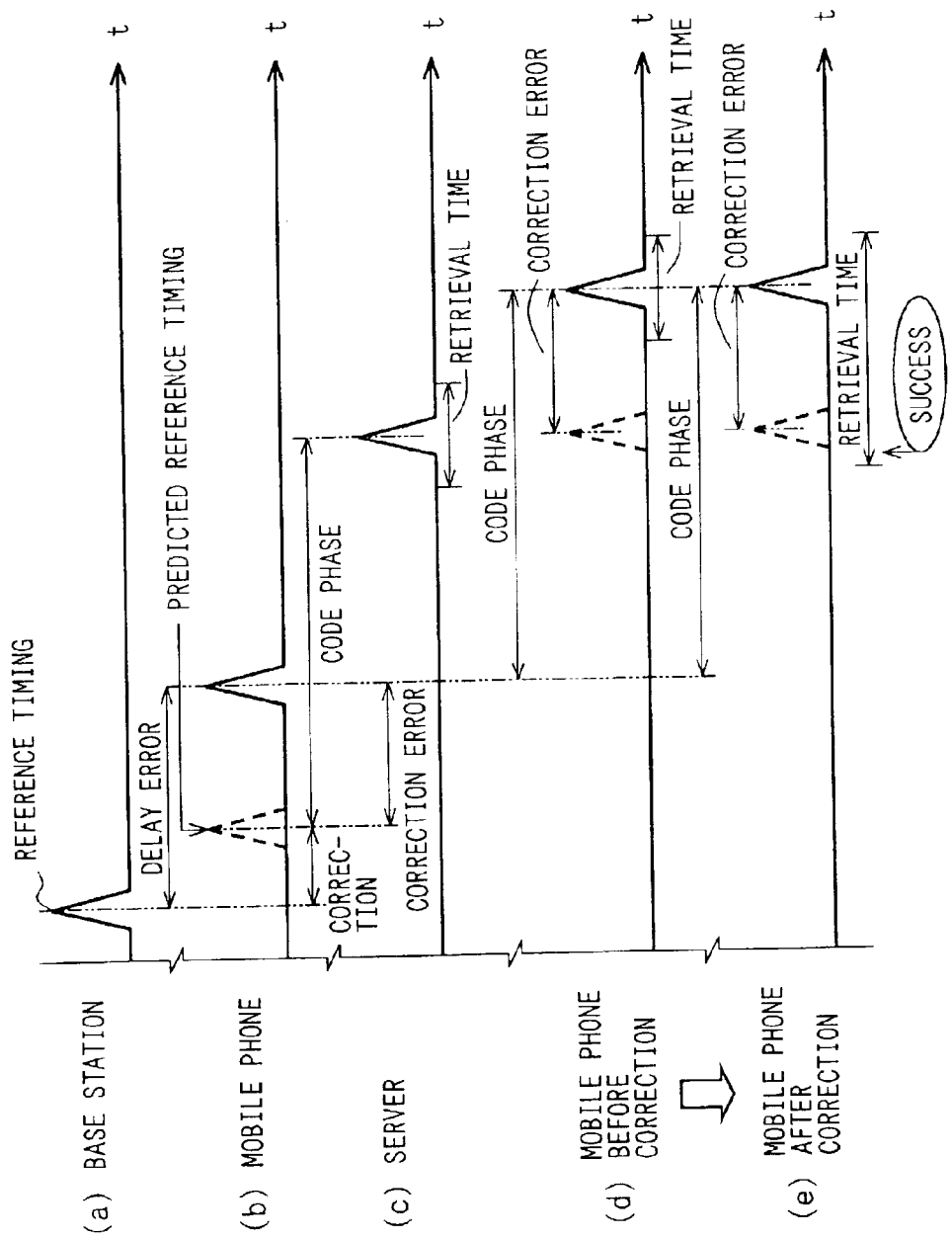

FIG. 14

| INDEX | SAT. NO. | ELEV. (°) | CODE PHASE | SEARCH WINDOW |
|---|---|---|---|---|
| 1 | 4 | 75 | → 25 | → 50 |
| 2 | 22 | 70 | 624 | 2 |
| 3 | 17 | 60 | 256 | 4 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

PARAMETER CORRECTION (4→50)
PARAMETER CORRECTION (30→25)

FIG. 16

| INDEX | SAT. NO. | ELEV. (°) | CODE PHASE | SEARCH WINDOW |
|---|---|---|---|---|
| 1 | 4 | 75 | 30 | → 80 |
| 2 | 22 | 70 | 624 | → 70 |
| 3 | 17 | 60 | 256 | → 140 |
| 4 | 8 | 55 | 24 | 28 |
| 5 | 31 | 50 | 811 | 65 |
| 6 | 5 | 45 | 86 | 80 |
| 7 | 6 | 35 | 155 | 28 |
| 8 | 27 | 30 | 334 | 10 |

PARAMETER CORRECTION (4→80)
PARAMETER CORRECTION (2→70)
PARAMETER CORRECTION (4→140)
⇩
NO CORRECTION
(CORRECTION COUNT=DEFINED NUMBER)

| INDEX | SAT. NO. | ELEV. (°) | CODE PHASE | SEARCH WINDOW |
|---|---|---|---|---|
| 1 | 4 | 75 | 30 | → 80 |
| 2 | 22 | 70 | 624 | → 40 |
| 3 | 17 | 60 | 256 | → 40 |
| 4 | 8 | 55 | 24 | → 28 |
| 5 | 31 | 50 | 811 | → 100 |
| 6 | 5 | 45 | 86 | → 120 |
| 7 | 6 | 35 | 155 | 28 |
| 8 | 27 | 30 | 334 | 10 |

PARAMETER CORRECTION (4→80)
PARAMETER CORRECTION (2→40)
PARAMETER CORRECTION (4→40)
NO CORRECTION
PARAMETER CORRECTION (65→100)
PARAMETER CORRECTION (80→120)

NO CORRECTION
(CORRECTION COUNT=DEFINED NUMBER)

RADIO COMMUNICATION TERMINAL AND POSITION SPECIFYING SYSTEM

CROSS REFERENCE TO RELATED APPLICATION

This application is based on and incorporates herein by reference Japanese Patent Application No. 2001-362523 filed on Nov. 28, 2001.

FIELD OF THE INVENTION

The present invention is related to a radio communication terminal arranged in such a manner that both retrieval timing and retrieval time, which are required to retrieve for GPS satellites, are received via a communication base station from a position information server. It is also related to a position specifying system constituted by the radio communication terminal and position information server, and to a computer program executed by the above radio communication terminal.

BACKGROUND OF THE INVENTION

As one of position specifying systems capable of specifying positions of radio communication terminals (radio communication terminals) such as, for instance, mobile phones and portable information terminals having communication functions, a position specifying system uses GPS (Global Positioning System) satellites and base stations. In this type of position specifying system, when a mobile phone is located at a place such as an outdoor place where GPS satellites may be satisfactorily retrieved, a present position of this mobile phone may be specified based upon GPS satellite signals transmitted from the GPS satellites. To the contrary, when the mobile phone is located at a place such as an indoor place where GPS satellites cannot be satisfactorily retrieved, a present position of this portable terminal may be specified based upon signal delay amounts of a base station signal transmitted from nearby base stations.

On the other hand, when a mobile phone may solely specify a present position thereof, almanac information of GPS satellites and almanac information of base stations must be stored in this mobile phone, and/or complex positioning calculations must be carried out in this mobile phone. Due to the above requirements, the mobile phone becomes considerably expensive and the structure of the mobile phone becomes complex. Under such a reason, another position specifying system has been proposed, in which a mobile phone does not solely specify a present position. That is, in this system, while the mobile phone transmits to a position information server both GPS satellite information which has been acquired by retrieving GPS satellites and also nearby base station information which has been acquired by retrieving nearby base station information, this position information server may specify a present position of the mobile phone based upon both the GPS satellite information and the nearby base station information, which are received form the mobile phone.

In such a system that the position information server specifies the present position of the mobile phone, this mobile phone determines, for instance, a nearby base station in which a signal delay amount of a base station signal is a minimum delay amount, as a reference base station among several nearby base stations which are located around a communication base station communicated with this portable terminal. Also, this mobile phone transmits the nearby base station information related to these nearby base stations to the position information server.

When the position information server receives the nearby base station information from the mobile phone, the position information server extracts both latitude and longitude of each of the nearby base stations based upon the received nearby base station information with reference to the almanac information of the base stations which has been previously held. Also, this position information server calculates quasi-distances between the own position information server and the respective nearby base stations based upon a relative relationship among the signal delay amounts of the base station signals transmitted from the respective nearby base stations, while the signal delay amount of the base station signal transmitted from the reference base station is used as a reference. Thus, this position information server predicts an approximate position of the mobile phone.

Then, the position information server sets both a code phase indicative of retrieval timing and a search window representative of retrieval time based upon the predicted approximate position of this mobile phone as a parameter which is required to retrieve for the GPS satellites by this mobile phone and also this position information server sets assist information. Then, the position information server transmits this set assist information to the mobile phone.

When the mobile phone receives the assist information from the position information server, this mobile phone extracts both the code phase and the search window from the received assist information, and then retrieves the GPS satellites so as to acquire the GPS satellite information based upon both the retrieval timing indicated by this extracted code phase and the retrieval time expressed by this extracted search window. Also, the mobile phone acquires the nearby base station information, and then transmits both the GPS satellite information and the nearby base station information, which has been acquired, to the position information server.

Then, when the position information server receives both the GPS satellite information and the nearby base station information from the mobile phone, this position information server specifies a present position of the mobile phone based upon both the GPS satellite information and the nearby base station information, which are received. Thus, this position information server transmits this specified present position of the mobile phone as a positioning result to the mobile phone.

On the other hand, since the above assist information and the like are transmitted/received via the communication base station between the mobile phone and the position information server, if a distance becomes long between the position where this communication base station is installed and the position where the potable phone is actually present, a time difference between the reference timing of the communication base station and the reference timing of the mobile phone may arise as a propagation delay error. Under such a circumstance, when the position information server predicts the approximate position of the mobile phone, this position information server considers the distance between this predicted approximate position of the mobile phone and the position where the communication base station is installed. Then, the position information server sets both a code phase and a search window, which have been corrected based upon this considered distance.

In this case, FIG. 18 and FIG. 19 represent a relationship between retrieval timing indicated by a code phase and retrieval time represented by a search window, which are set by the above position information server. In this case, this position information server considers the distance between this predicted approximate position of the mobile phone and the position where the communication base station is installed, and then, predicts reference timing of the mobile phone so as to calculate a correction value. At this time, such a time difference is expressed as a correction error between the actual reference timing of the mobile phone and the reference timing of the mobile phone which is predicted by the position information server. Then, this correction error may be produced as a time difference between the retrieval timing set by the position information server and the retrieval timing at which the mobile phone actually retrieves the GPS satellites.

In this case, when a time difference between the actual reference timing of the mobile phone and the reference timing of the mobile phone predicted by the position information server is small, as shown in FIG. 18, the correction error becomes small. As a result, the retrieval timing set by the position information server is not deviated from the retrieval time during which the mobile phone actually retrieves the GPS satellites ((d) in FIG. 18). Also, the mobile phone can retrieve for the GPS satellites at the ideal retrieval timing of the GPS satellites. Then, when the mobile phone can succeed in the retrieving operation of the GPS satellites, the position information server can properly specify the present position of the mobile phone.

However, when a time difference between the actual reference timing of the mobile phone and the reference timing of the mobile phone predicted by the position information server is large, as shown in FIG. 19, the correction error becomes large. As a result, the retrieval timing set by the position information server deviates from the retrieval time during which the mobile phone actually retrieves the GPS satellites ((d) in FIG. 19), so that, the mobile phone cannot retrieve for the GPS satellites at the ideal retrieval timing of the GPS satellites. Then, when the mobile phone fails in the retrieving operation of the GPS satellites, the position information server cannot properly specify the present position of the mobile phone.

SUMMARY OF THE INVENTION

The present invention has therefore an object to provide a radio communication terminal, a position specifying system, and a computer program, which are capable of successfully retrieving GPS satellites, and accordingly properly specifying a present position of the radio communication terminal.

In accordance with a radio communication terminal of the present invention, when the radio communication terminal receives both retrieval timing and retrieval time, which have been set with respect to each of GPS satellites by a position information server, via a communication base station from the position information server, the radio communication terminal corrects at least any one of the retrieval timing and the retrieval time, which are notified from this position information server, in such a manner that the retrieval timing is moved, or the retrieval time is prolonged, and then sets the corrected retrieval timing, or the corrected retrieval time. The radio communication terminal retrieves the GPS satellites based upon the both the retrieval timing and the retrieval time, which have been corrected to be set, so as to acquire GPS satellite information. The radio communication terminal transmits the acquired GPS satellite information via the communication base station to the position information server. Then, when the position information server receives the GPS satellite information from the radio communication terminal, this position information server specifies a present position of the radio communication terminal based upon at least this received GPS satellite information.

As a consequence, even in a case that the time difference between the actual reference timing of the radio communication terminal and the reference timing of the radio communication terminal predicted by the position information server is large, namely the correction error is large, at least any one of the retrieval timing and the retrieval time is corrected to be set in such a manner that either this retrieval timing is moved, or this retrieval time is prolonged. As a result, it is possible to avoid that the retrieval timing set by the position information server deviates from the retrieval time during which the radio communication terminal actually retrieves the GPS satellites. As a result, the radio communication terminal can succeed in the retrieving operation of the GPS satellites. Also, the position information server can properly specify the present position of the radio communication terminal.

BRIEF DESCRIPTION OF THE DRAWINGS

For a better understanding of the present invention, reference is made of a detailed description in conjunction with the accompanying drawings, in which:

FIG. 5 is a table showing an example of assist information;

FIG. 6 is a table showing an example of plural pieces of the assist information which are sorted in the order of higher elevation angles;

FIG. 7 is a table showing a relationship between search windows and retrieval time;

FIG. 8 is a table showing one example of assist information which has been set by correcting only the search windows;

FIG. 10 is a table showing another example of assist information which has been set by correcting only the search window, and corresponds to that of FIG. 8;

FIG. 11 is a time chart showing a relationship between retrieval timing and retrieval time, corresponding to that of FIG. 9, in the position specifying system;

FIG. 12 is a table showing one example of assist information which has been set by correcting only the code phases;

FIG. 14 is a table showing an example of assist information which has been set by correcting both the search windows and the code phases;

FIG. 16 is a table showing an example of assist information in the case that total retrieval time reaches defined retrieval time;

DETAILED DESCRIPTION OF THE PREFERRED EMBODIMENTS

A description will now be made of a position specifying system in which a radio communication terminal according to an embodiment of the present invention is applied to a mobile phone with reference to FIG. 1 to FIG. 17.

Figure 1:
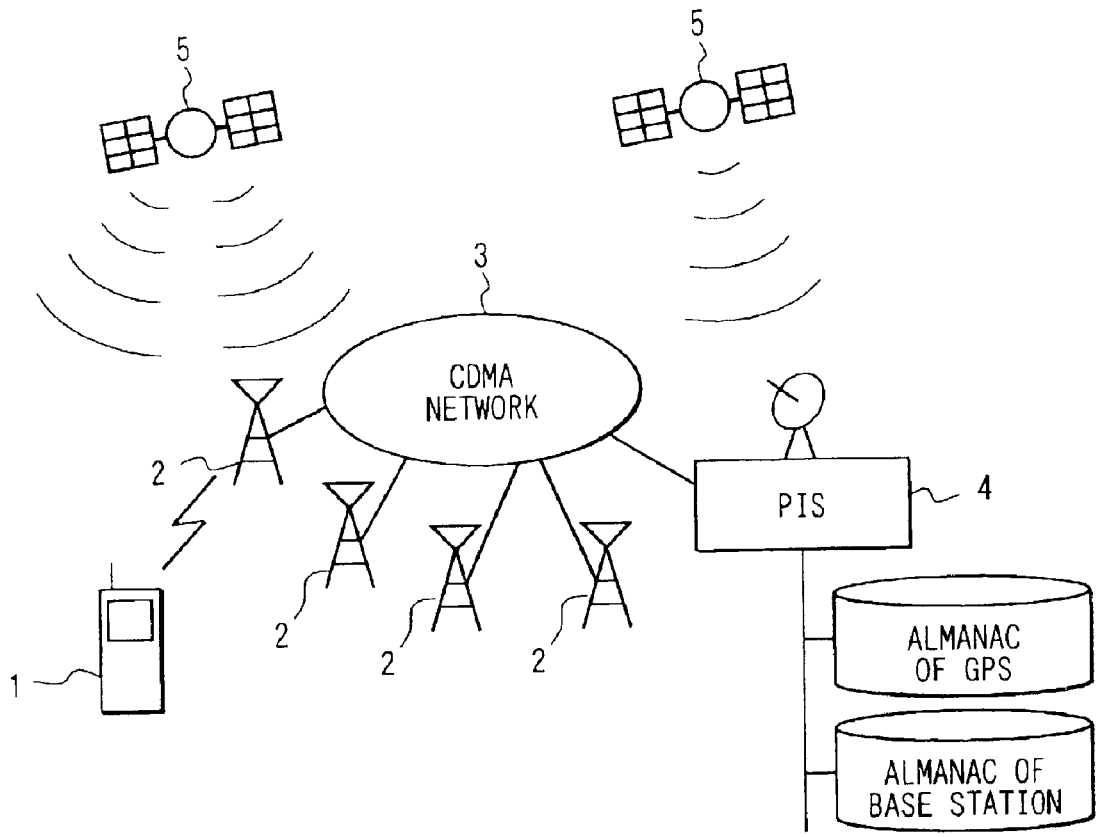
FIG. 1 is a schematic diagram showing an entire arrangement of a position specifying system according to an embodiment of the present invention.

First, in FIG. 1, a mobile phone 1 determines a communication base station from a plurality of base stations 2 based upon, for example, strengths of electric fields received from base station signals, and transmits/receives various sorts of information via a CDMA (Code Division Multiple Access) network 3 by this determined communication base station between the own mobile phone and a position information server (PIS) 4. Both the mobile phone 1 and the position information server 4 receive GPS satellite signals transmitted from GPS (Global Positioning System) satellites 5. Also, the position information server 4 holds both almanac information related to the GPS satellites 5 and almanac information related to the base stations 2 (setting position, direction of antenna (namely, directivity), service area etc.)

Figure 2:
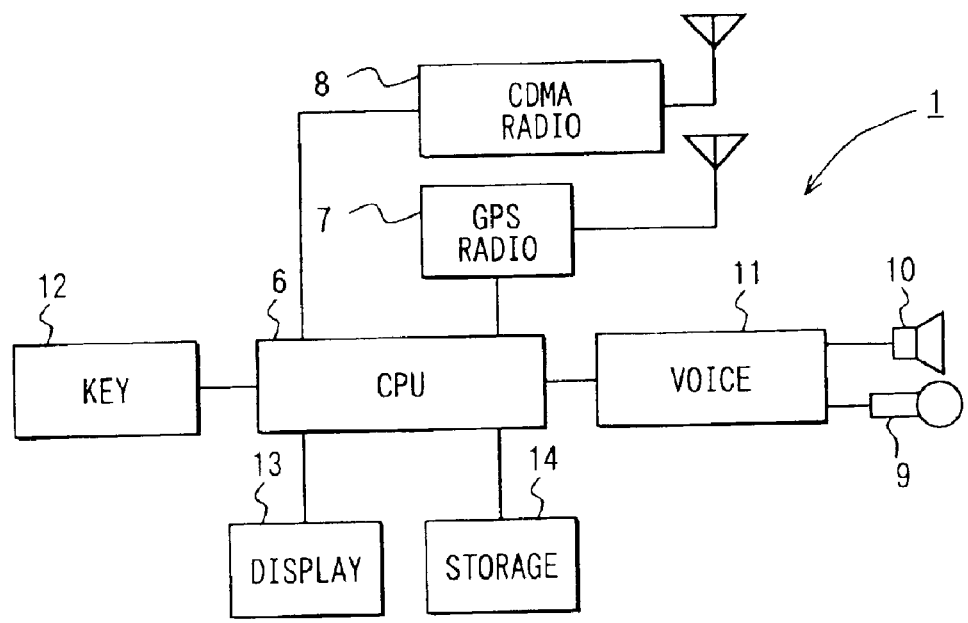
FIG. 2 is a block diagram showing a structure of a mobile phone used in the position specifying system.
Figure 3:
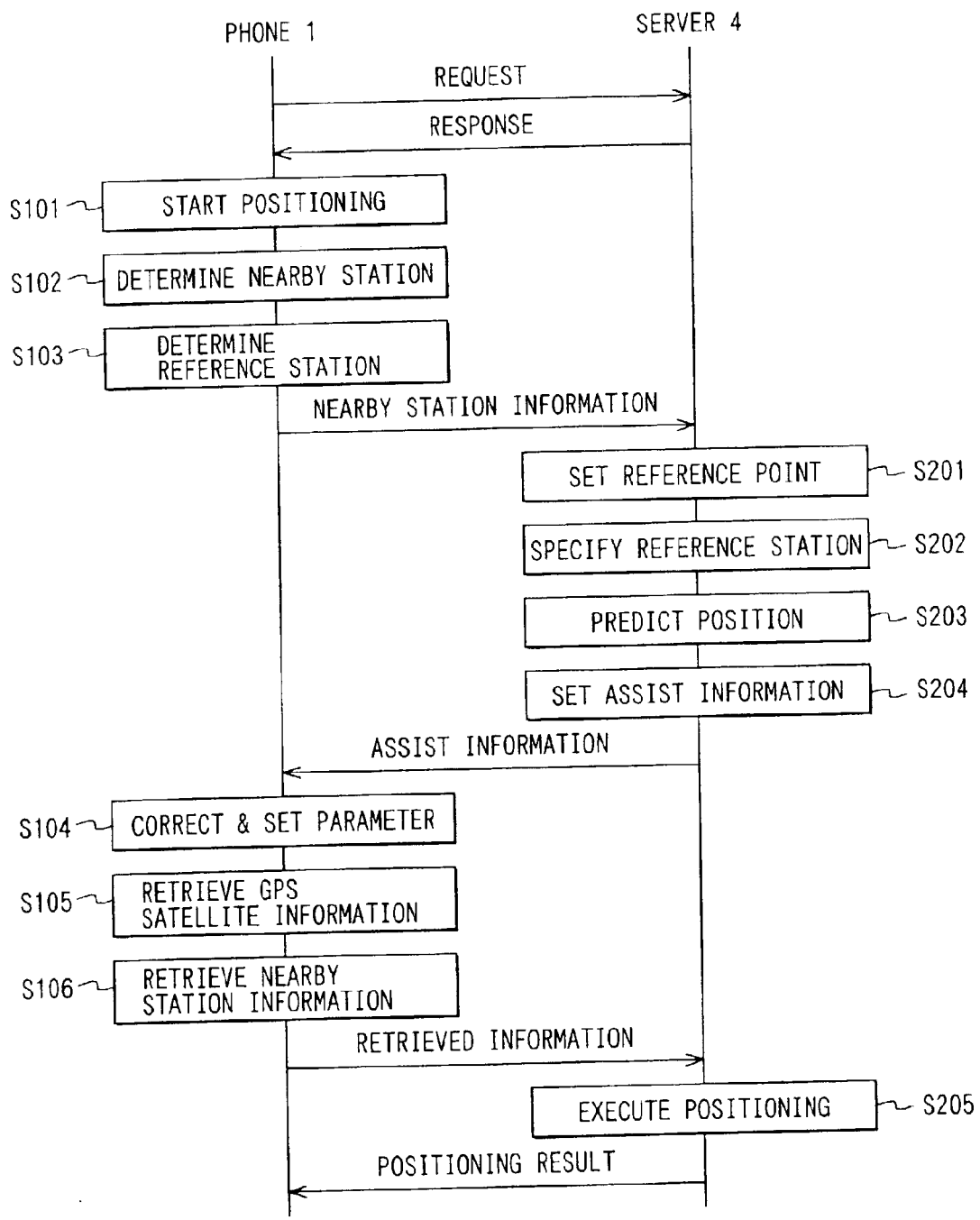
FIG. 3 is a flow diagram schematically showing an operation process of the position specifying system.
Figure 4:
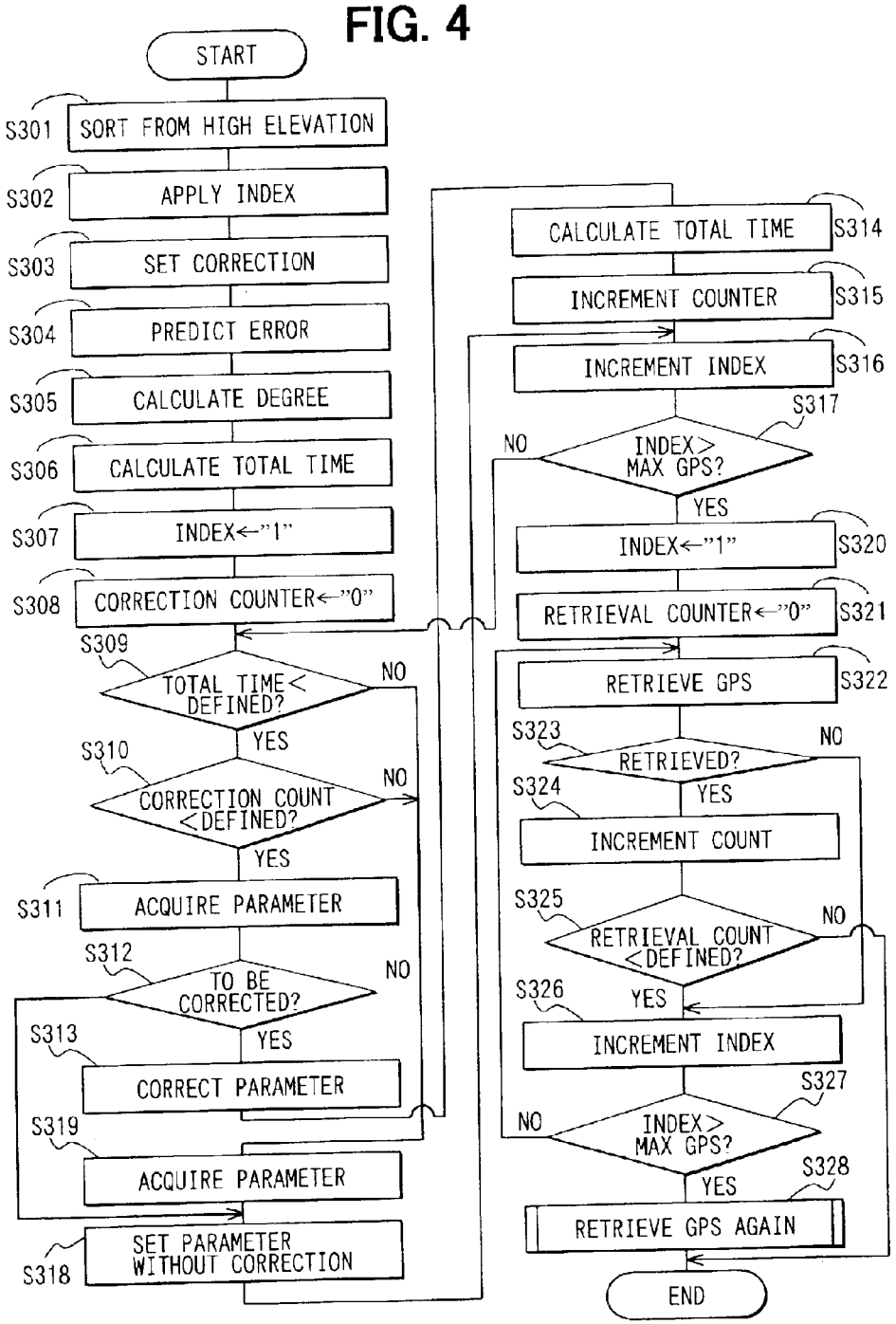
FIG. 4 is a flowchart showing a processing operation executed by the mobile phone.

FIG. 2 schematically shows functional blocks of the mobile phone 1. The mobile phone 1 is arranged in such a way that a GPS radio unit 7 for retrieving the GPS satellites 5, a CDMA radio unit 8, a voice processing unit 11, a key operation unit 12, a display unit 13, and a storage unit 14 are connected to a CPU (Central Processing Unit) 6 which is mainly constructed of a microcomputer. The CDMA radio unit 8 retrieves the base station 2, and also transmits/receives information via the CDMA network 3 between the own CDMA radio unit 8 and the position information server 4. The voice processing unit 11 processes phone transmission voice entered from a microphone 9 and phone reception voice outputted from a speaker 10. The key operation unit 12 is constituted by a key pad on which a large number of keys are arranged. These keys are provided as a "phone communication start" key, a "phone communication end" key, "numeral" keys of "0" to "9", and so on.

The display unit 13 is constituted by a liquid crystal display which displays thereon a date, time instant, phone number, and the like. The storage unit 14 includes a RAM (Random Access Memory) and a ROM (Read-only Memory). It should be noted that in this case, the operation unit 12 may be constructed of a touch panel type operation unit displayed on the display unit 13. The antennas may be integrated into a single one which operates as an antenna of the GPS radio unit 7 and an antenna of the CDMA radio unit 8.

Next, operations of the above arrangement will now be explained with reference to FIG. 3 to FIG. 17.

First, the mobile phone 1 detects, for example, a phone user's instruction to start a positioning operation, or detects an instruction to start a positioning operation issued from the CDMA network 3. When the mobile phone 1 accepts the request of commencing the positioning operation, the mobile phone 1 transmits a positioning request to the position information server 4. When the position information server 4 receives the positioning request from the mobile phone 1, this position information server 4 determines whether the positioning operation can be executed. When the position information server 4 determines that the positioning operation can be carried out, this position information server 4 transmits a positioning response to the mobile phone 1.

When the mobile phone 1 receives the positioning response from the position information server 4, the mobile phone 1 commences a positioning operation (step S101), retrieves a plurality of nearby base stations which are located in a nearby area of the communication base station (step S102), and determines such a nearby base station as a reference base station among these nearby base stations (step S103). In this nearby base station, for instance, a signal delay amount of a base station signal is a minimum signal delay amount. Then, the mobile phone 1 transmits nearby base station information related to these nearby base stations in combination with terminal information (phone number etc.) to the position information server 4.

Upon receipt of both the terminal information and the nearby base station information transmitted from the mobile phone, the position information server 4 sets a positioning reference point based upon the received nearby base station information (step S201), and also, specifies a reference base station (step S202). Then, the position information server 4 refers to almanac information of a base station 2, and extracts both latitude and longitude of each of the nearby base stations based upon these nearby base station information received from the mobile phone 1. Also, the position information server 4 calculates quasi-distances between the own position information server 4 and the respective nearby base stations based upon a relative relationship between the signal delay amounts of the base station signals transmitted from the respective nearby base stations, while a signal delay amount of a base station signal transmitted from the reference base station is employed as a reference. Thus, this position information server 4 predicts an approximate position of the mobile phone 1 (step S203).

Subsequently, the position information server 4 sets both a code phase indicative of retrieval timing and a search window indicative of retrieval time as a portion of parameters which are required when the mobile phone 1 retrieves the GPS satellites 5, and also, this position information server 4 sets assist information with respect to each of the GPS satellites 5, while this assist information includes a satellite number, an elevation angle, a code phase, and a search window (step S204). Then, the position information server 4 transmits this set assist information to the mobile phone 1. It should also be noted that although the satellite number, the elevation angle, the code phase, the search window, and other parameters are actually contained in the assist information, other parameters are omitted in this embodiment.

Then, when the portable terminal 1 receives the assist information from the positional information 4, the mobile phone 1 corrects at least any one of the search window and the code phase, which correspond to a portion of the parameters contained in this received assist information, and then sets the corrected parameter. Otherwise, the mobile phone 1 sets these parameters without any correction (step S104). Based upon this set parameter, this mobile phone 1 retrieves the GPS satellites 5 so as to acquire GPS satellite information related to the GPS satellites 5 (step S105). A process operation executed until the mobile phone 1 acquires the GPS satellite information will be explained with reference to FIG. 4 through FIG. 17. It should be understood that FIG. 4 indicates that process operations executed by the mobile phone 1 are indicated as a flow chart.

When the mobile phone 1 receives the assist information from the position information server 4, the mobile phone 1 extracts the satellite number, the elevation angle, the code phase, and the search window from this received assist information, and also sorts all of the GPS satellites 5 notified from the position information server 4 in the order of higher elevation angles (step S301). Then, the mobile phone 1 applies indexes with respect to all of the GPS satellites 5 in such a manner that these GPS satellites 5 are ordered in an ascent sequence in the higher elevation order (step S302).

Specifically, as shown in FIG. 5, assuming now that the satellite numbers, the elevation angles, the code phases, and the search windows as to 8 pieces of these GPS satellites 5 are contained in the assist information notified from the position information server 4, as shown in FIG. 6, the mobile phone 1 sorts these eight GPS satellites 5 in the higher elevation angle order. Then it applies indexes with respect to all of the eight GPS satellites 5 in such a manner that these GPS satellites 5 are ordered in the ascent sequence in the higher elevation order.

In this case, since the elevation angle of the GPS satellite 5 having the satellite number "4" is equal to "75" degrees, that is, the highest elevation angle, the mobile phone 1 applies an index "1" with respect to the GPS satellite 5 having the satellite number "4." Next, since the elevation angle of the GPS satellite 5 having the satellite number "22" is equal to "70" degrees, that is, the second highest elevation angle, as compared with that of the GPS satellite 5 having the satellite number "4", the mobile phone 1 applies an index "2" with respect to the GPS satellite 5 having the satellite number "22."

Next, since the elevation angle of the GPS satellite 5 having the satellite number "17" is equal to "60" degrees, that is, the third highest elevation angle, as compared with that of the GPS satellite 5 having the satellite number "22", the mobile phone 1 applies an index "3" with respect to the GPS satellite 5 having the satellite number "17." The mobile phone 1 applies indexes with respect to all of these GPS satellites 5 which are notified from the position information server 4 in the above manner.

Next, the mobile phone 1 sets a defined correction number (step S303). In this case, this defined correction number implies a total number of such GPS satellite 5 in which at least any one of a code phase and a search window should be corrected. This defined correction number is set by the following reason. That is, assuming that the mobile phone 1 corrects the parameters which have been set with respect to all of the GPS satellites 5 to set these corrected parameters, the mobile phone 1 would also set the parameters which have been set to such GPS satellites 5 having low elevation angles and would set these corrected parameters, namely would eventually correct these parameters which have been set with respect to the GPS satellites 5 having low reliability and would set these corrected parameters.

Thus, even when the mobile phone 1 retrieves the GPS satellites having low reliability, whose parameters have been corrected to be set, since the GPS satellite information cannot be effectively acquired by this mobile phone 1, a certain limitation is made in a total number of such GPS satellites 5 whose parameters should be corrected. Also, when parameters are corrected to be set, there are some cases that retrieval time is accordingly prolonged. In order that the increase of this retrieval time may be effectively suppressed to a minimum necessary value, this defined correction number is also set by such a reason that parameters of GPS satellites 5 having higher elevation angles, namely, GPS satellites 5 having higher reliability are corrected in a top priority so as to set the corrected parameter.

Subsequently, the mobile phone 1 predicts a correction error obtained when the position information server 4 predicts an approximate position of the mobile phone 1 (step S304), and then calculates a correction degree of a parameter based upon this predicted correction error (step S305). That is, when the mobile phone 1 predicts that the correction error obtained when the position information server 4 predicts the approximate position of the mobile phone 1 is small, the mobile phone 1 calculates that the correction degree of the parameter is small. To the contrary, when the mobile phone 1 predicts that the correction error obtained when the position information server 4 predicts the approximate position of the mobile phone 1 is large, the mobile phone 1 calculates that the correction degree of the parameter is large.

Next, the mobile phone 1 calculates total retrieval time based on the search windows which are set with respect to the respective GPS satellites 5 notified from the position information server 4 (step S306). In this case, this total retrieval time corresponds to such a time required to retrieve all of the GPS satellites 5 notified from the position information server 4. In this case, since both the search windows and the retrieval time constitute such a relationship as shown in FIG. 7, the mobile phone 1 may calculate "10 (milliseconds)×6 pieces+30 (milliseconds)×2 pieces=120 milliseconds" by the following reason. That is, in this case, as shown in FIG. 6, search windows "0 to 31 (chip)" are set with respect to six pieces of GPS satellites 5 (namely, GPS satellites 5 having satellite numbers "4", "22", "17", "8", "6" and "27") among all of the eight GPS satellites 5. Also, search windows "64 to 95 (chip)" are set with respect to two GPS satellites 5 (namely, GPS satellites 5 having satellite numbers "31" and "5"). Here, chip means a CDMA code or code word (chip code).

Next, the mobile phone 1 sets "1" to an index (step S307), and sets "0" to a parameter correction counter (step S308). In this case, a count value of this parameter correction counter is equal to a total number of GPS satellites 5 whose parameters have been corrected to be set.

Next, the mobile phone 1 compares such a defined retrieval time with the total retrieval time which has been calculated prior to this retrieval time in order to determine whether the total retrieval time reaches the defined retrieval time (step S309). In this case, this defined retrieval time implies such a retrieval time allowed to the mobile phone 1 which intends to retrieve for the GPS satellites 5. This defined retrieval time is set by the following reason. That is, if lengthy time is required so as to retrieve for the GPS satellites 5 by this mobile phone 5, then there are certain possible cases that the mobile phone cannot properly perform operations related to phone communications (for instance, registration of position, detection of phone calling, and so on). Therefore, a certain limitation is made in time used to retrieve for the GPS satellites 5.

It is so assumed that for example, "200 (milliseconds)" is set as the defined retrieval time. As explained in this case, when the total retrieval time is equal to "120 (milliseconds)", since this total retrieval time does not reach the defined retrieval time ("YES" in step S309), the mobile phone 1 compares the previously-set count value of the parameter correction counter with the previously-set defined correction number in order to determine whether the count value of the parameter correction counter reaches the defined correction number (step S310).

Then, assuming that, for example, "5" is set as the defined correction number, as explained in this case, when the count value of the parameter correction counter is equal to "0", since the count value of the parameter correction counter does not reach the defined correction number ("YES" in step S310), the mobile phone 1 acquires such a parameter (both code phase and search window) which has been set with respect to the GPS satellite 5 instructed by an index at this time (step S311). In this case, since the index is set to "1", the mobile phone 1 acquires the search window set to "4 (chip)" and the code phase set to "30 (chip)", as the parameter set with respect to the GPS satellite 5 having the satellite number "4" to which the index of "1" has been applied.

Then, since the mobile phone 1 receives such an operation that the position information server 4 predicts the correction error when this position information server 4 predicts the approximate position of the mobile phone 1, this mobile phone 1 compares this acquired parameter with the predicted correction error, so that the mobile phone 1 determines whether this acquired parameter should be corrected (step S312). In this case, when this acquired parameter (namely, parameter set by position information server 4) exceeds a range of the predicted correction error, the mobile phone 1 determines that this acquired parameter should be corrected ("YES" in step S312). Then, the mobile phone 1 corrects this acquired parameter based upon the correction degree of the parameter which has been calculated prior to this acquired parameter, and then sets this corrected parameter (step S313).

In this case, as a mode for correcting a parameter to set the corrected parameter, there are three cases. First, only a search window is corrected to set the corrected window. Second, only a code phase is corrected to set the corrected code phase. Third, both a search window and a code phase are corrected to set the corrected search window and the corrected code phase.

(1) In the case that only a search window is corrected to be set:

In this case, as shown in FIG. 6, when the search window is set to "4 (chip)" with respect to the GPS satellite 5 having the satellite number "4" to which the index "1" is set, the mobile phone 1 corrects this search window from "4 (chip)" to, for instance, "80 (chip)" to set the corrected search window (FIG. 8).

Figure 9:
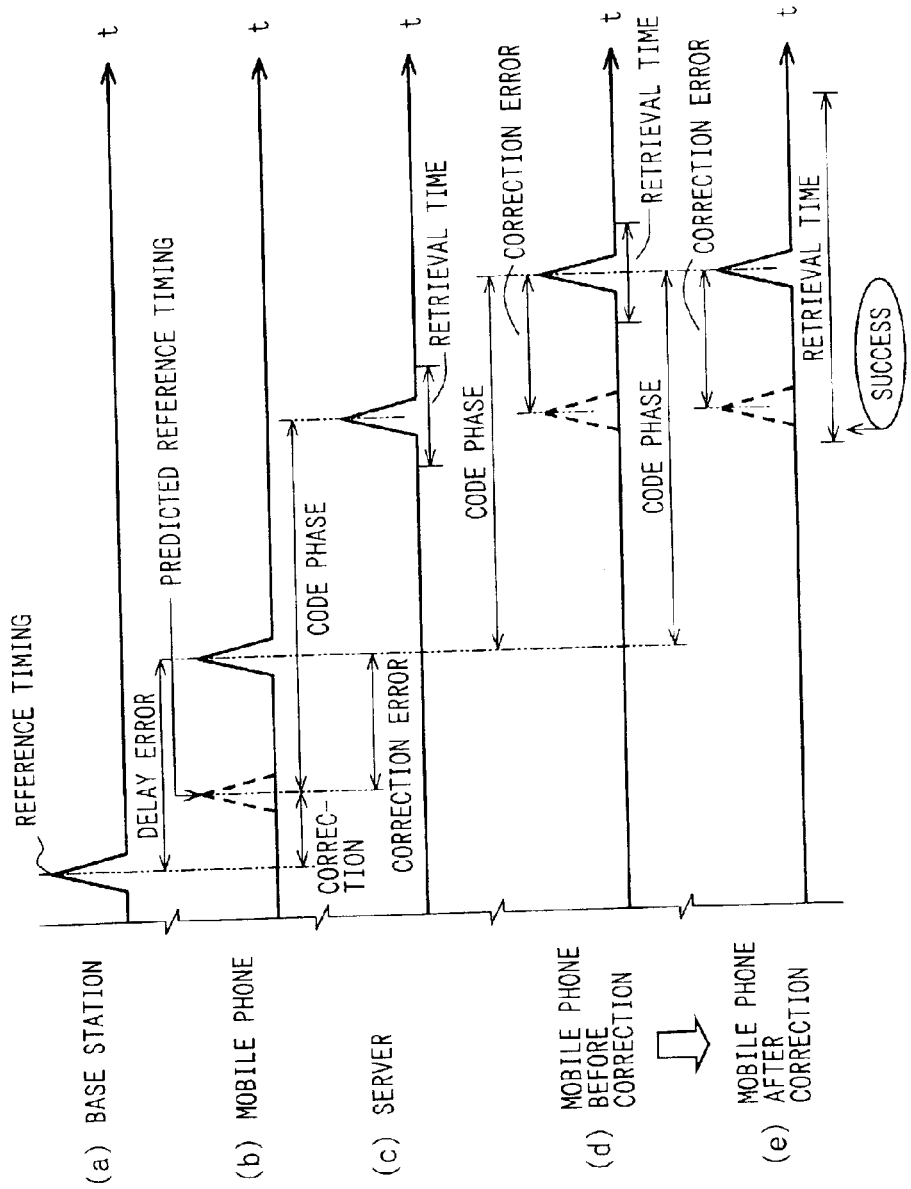
FIG. 9 is a time chart showing a relationship between retrieval timing and retrieval time in the position specifying system.
Figure 13:
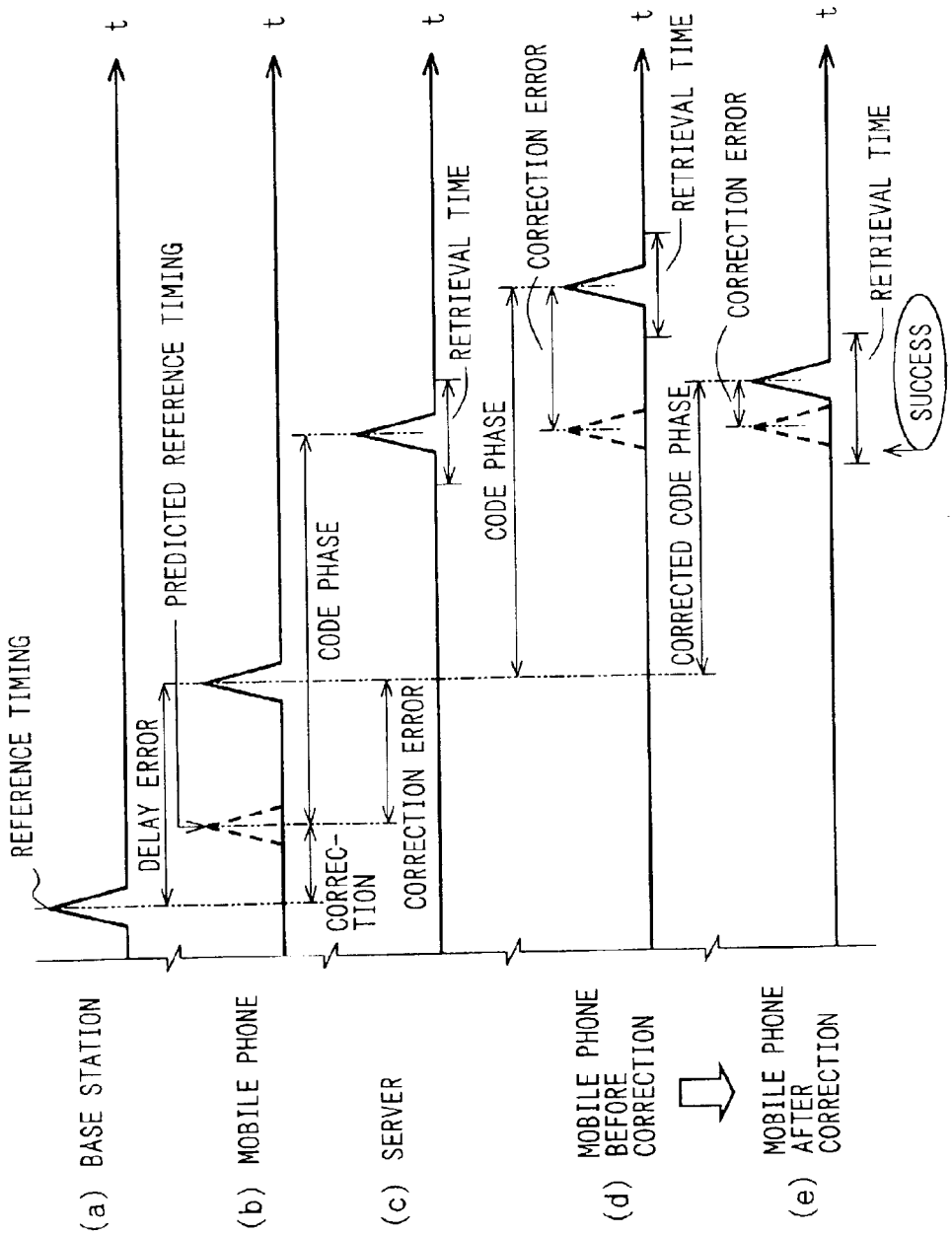
FIG. 13 is a time chart showing a relationship between retrieval timing and retrieval time, corresponding to that of FIG. 9, in the position specifying system.
Figure 15:
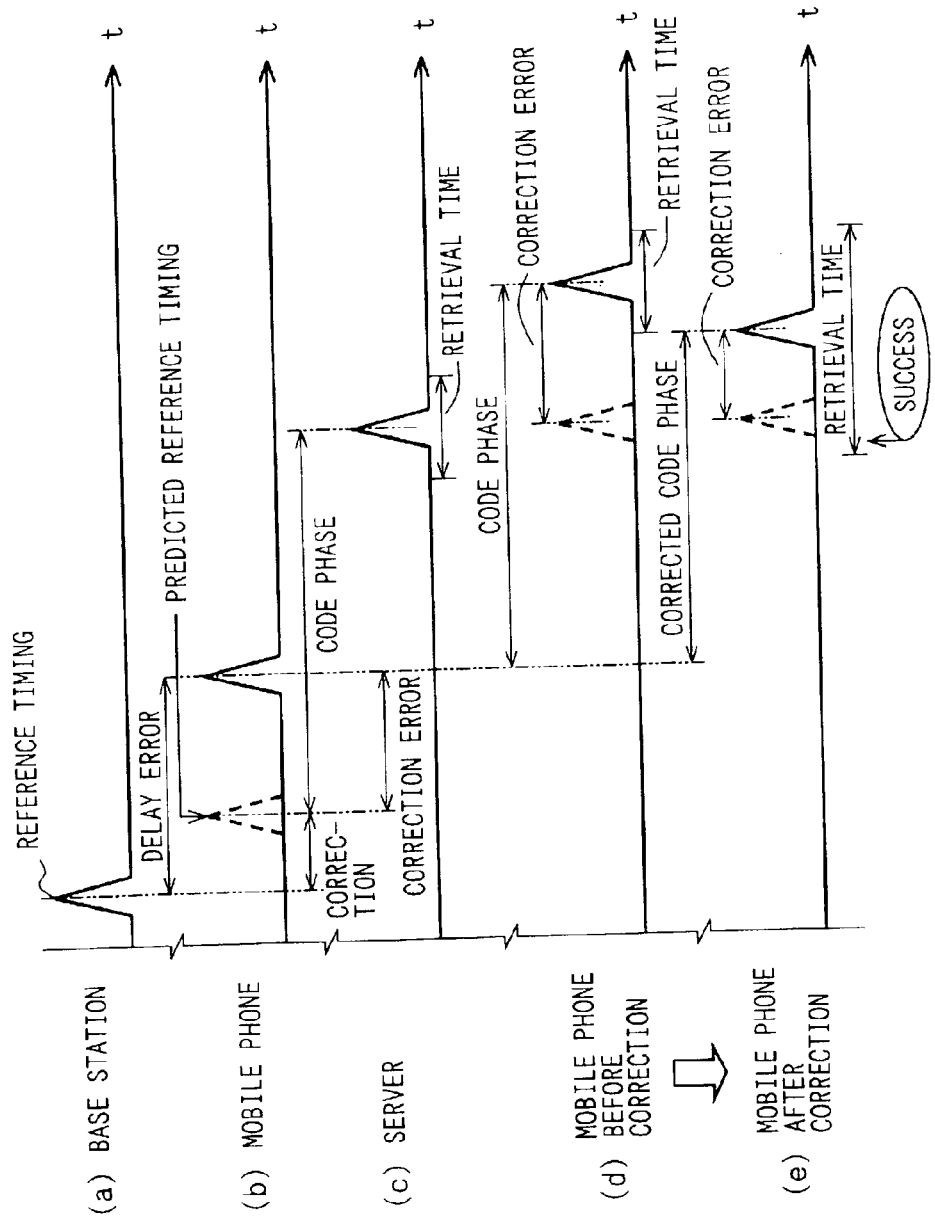
FIG. 15 is a time chart showing a relationship between retrieval timing and retrieval time, corresponding to that of FIG. 9, in the position specifying system.

As a result, as shown in FIG. 9, before the search window is corrected to be set, the retrieval timing set by the position information server 4 deviates from the retrieval time during which the mobile phone 1 actually retrieves the GPS satellites 5 ((d) in FIG. 9). However, since the search window is corrected from "4 (chip)" to "80 (chip)", the retrieval time is prolonged from "10 (milliseconds)" to "30 (milliseconds)" by "20 (milliseconds)" due to the relationship between the search window and the retrieval time shown in FIG. 7. As a result, when the mobile phone 1 subsequently retrieves the GPS satellite 5 having the satellite number "4", it is possible in advance to avoid a case that the retrieval timing set by the position information server 4 deviates from the retrieval time during which the mobile phone 1 actually retrieves the GPS satellites 5 ((e) in FIG. 9). Thus, the mobile phone 1 can succeed in the retrieving operation of the GPS receivers 5.

On the other hand, the mobile phone 1 need not always correct the search window to set the corrected search window in such a manner that the retrieval time may be time-sequentially prolonged in the bidirectional manner. Alternatively, the mobile phone 1 may correct the search window to set the corrected search window in such a manner that the retrieval time is time-sequentially prolonged only in one direction. That is, as shown in FIG. 10, the mobile phone 1 may correct the search window from "4 (chip)" to, for example, "50 (chip)" to set the corrected search window.

As a result, as shown in FIG. 11, since the search window is corrected from "4 (chip)" to "50 (chip)", the retrieval time is time-sequentially prolonged from "10 (milliseconds)" to "20 (milliseconds)" by "10 (milliseconds)" along one direction due to the relationship between the search window and the retrieval time shown in FIG. 7. As a result, also in this case, when the mobile phone 1 subsequently retrieves the GPS satellite 5 having the satellite number "4", it is possible in advance to avoid a case that the retrieval timing set by the position information server 4 deviates from the retrieval time during which the mobile phone 1 actually retrieves the GPS satellites 5 ((e) FIG. 11), and thus, a possibility that the mobile phone 1 can succeed in the retrieving operation of the GPS receivers 5 can be increased.

(2) In the case that only a code phase is corrected to be set:

In this case, as shown in FIG. 6, when the code phase is set to "30 (chip)" with respect to the GPS satellite 5 having the satellite number "4" to which the index "1" is set, the mobile phone 1 corrects this code phase from "30 (chip)" to, for instance, "20(chip)" to set the corrected code phase (FIG. 12).

As a result, since the code phase is corrected from "30 (chip)" to "20 (chip)" to be set, the retrieval time is moved (namely, correction error becomes small). As a consequence, also in this case, when the mobile phone 1 subsequently retrieves the GPS satellite 5 having the satellite number "4", it is possible in advance to avoid a case that the retrieval timing set by the position information server 4 deviates from the retrieval time during which the mobile phone 1 actually retrieves the GPS satellites 5 ((e) in FIG. 13), and thus, a possibility that the mobile phone 1 can succeed in the retrieving operation of the GPS receivers 5 can be increased.

(3) In the case that both a search window and a code phase are corrected to be set:

In this case, as shown in FIG. 14, the mobile phone 1 corrects the search window from "4 (chip)" into, for example, "50 (chip)" to set the corrected search window. At the same time, the mobile phone 1 corrects the code phase from "30 (chip)" into, for example, "25 (chip)" to set the corrected code phase. At this time, a degree at which the search window is corrected to be set may be made smaller than a degree at which the above search window only is corrected to be set, namely, in the case that the search window is corrected from "4 (chip)" to "80 (chip)" to be set. Also, a degree at which the code phase is corrected to be set may be made smaller than a degree at which the above code phase only is corrected to be set, namely, in the case that the code phase is corrected from "30 (chip)" to "20 (chip)" to be set.

As a result, since the search window is corrected from "4 (chip)" to "50 (chip)" to be set, the retrieval time is prolonged from "10 (milliseconds)" to "20 (milliseconds)" by "10 (milliseconds)." At the same time, since the code phase is corrected from "30 (chip)" to "25 (chip)" to be set, the retrieval timing is moved. Accordingly, also in this case, when the mobile phone 1 subsequently retrieves the GPS satellite 5 having the satellite number "4", it is possible in advance to avoid a case that the retrieval timing set by the position information server 4 deviates from the retrieval time during which the mobile phone 1 actually retrieves the GPS satellites 5 ((e) in FIG. 15), and thus, the mobile phone 1 can succeed in the retrieving operation of the GPS receivers 5.

As previously explained, the mobile phone 1 corrects the parameter in accordance with any one of the above modes (1) to (3), and then sets the corrected parameter. Then, when the mobile phone 1 corrects the parameter in this manner to set the corrected parameter, this mobile phone 1 executes the below-mentioned process operation. In this case, as a mode that the mobile phone 1 subsequently corrects a parameter to set this corrected parameter, a description will now be made of the item (1) "search window only is corrected to be set among the above items (1) to (3).

Next, the mobile phone 1 again calculates total retrieval time based upon the search windows which have been set with respect to the respective GPS satellites 5, while this total retrieval time is required to retrieve all of the GPS satellites 5 notified from the position information server 4 (step S314). Specifically, as explained in this case, when the mobile phone 1 corrects the search window from "4 (chip)" to "80 (chip)", which is set with respect to the GPS satellite 5 having the satellite number "4" to which the index "1" has been applied, and then sets this corrected search window, since this retrieval time is corrected from "10 (milliseconds)" to "30 (milliseconds)" to be set, this corrected retrieval time is increased by "20 (milliseconds)." As a result, the mobile phone 1 calculates "140 (milliseconds)" as the total retrieval time. Then, the mobile phone 1 increments the parameter correction counter (step S315), and increments the index (step S316).

Subsequently, the mobile phone 1 compares the incremented index with the number (eight in this case) of GPS satellites notified from the position information server 4 in order to determine whether the incremented index exceeds the number of GPS satellites 5 (max GPS) notified from the position information server 4 (step S317). If the incremented index does not exceed the number of GPS satellites 5 notified from the position information server 4 ("NO" in step S317), then the mobile phone 1 again executes the above process operations defined after the step S309 from that on.

As previously described, the mobile phone 1 determines whether the parameter set by the position information server 4 must be corrected with respect to all of the GPS satellites 5 notified from the position information server 4 either until the total retrieval time reaches the defined retrieval time or until the count value of the parameter correction counter reaches the defined correction number. When the mobile phone 1 determines that the parameter must be corrected, the mobile phone 1 corrects this parameter to set the corrected parameter.

It should be understood that if the parameter set by the position information server 4 does not exceed the range of the predicted correction error, then the mobile phone 1 determines that this acquired parameter should not be corrected ("NO" in step S312), and directly sets the parameter set by the position information server 4 without any correction (step S318), and also increments the index (step S316).

Then, the mobile phone 1 compares the incremented index with the number of GPS satellites 5 notified from the position information server 4 in order to determine whether the incremented index exceeds the number of GPS satellites 5 notified from the position information server 4 (step S317).

Also, either the total retrieval time reaches the defined retrieval time ("NO" in step S309) or the count value of the parameter correction counter reaches the defined correction number ("NO" in step S310), the mobile phone 1 acquires a parameter which is set with respect to the GPS satellite 5 instructed by the index at this time (step S319). Also at this time, similar to process operation when it is so judged that the parameter must not be corrected, the mobile phone 1 does not correct this acquired parameter. In other words, the mobile phone 1 directly sets the parameter set by the position information server 4 (step S318) without correction.

As shown in FIG. 16, in a case that the mobile phone 1 corrects the search window from "4 (chip)" to "80 (chip)" to set the corrected search window with respect to the GPS satellite 5 having the satellite number "4" to which the index "1" has been applied; next, the mobile phone 1 corrects the search window from "2 (chip)" to, for example, "70 (chip)" with respect to the GPS satellite 5 having the satellite number "22" to which the index "2" has been applied; and subsequently, the mobile phone 1 corrects the search window from "4 (chip)" to, for example, "140(chip)" with respect to the GPS satellite 5 having the satellite number "17" to which the index "3" has been applied, the mobile phone 1 may calculate "200 (milliseconds)" as the total retrieval time based upon the relationship between the search window and retrieval time shown in FIG. 7, although the count value of the parameter correction counter does not reach the defined correction number. As a consequence, since the total retrieval time may reach the defined retrieval time, the mobile phone 1 subsequently sets the parameter without any correction.

Figure 17:
FIG. 17 is a table showing an example of assist information in the case that a count value of a parameter correction counter reaches a defined correction number.
Figure 18:
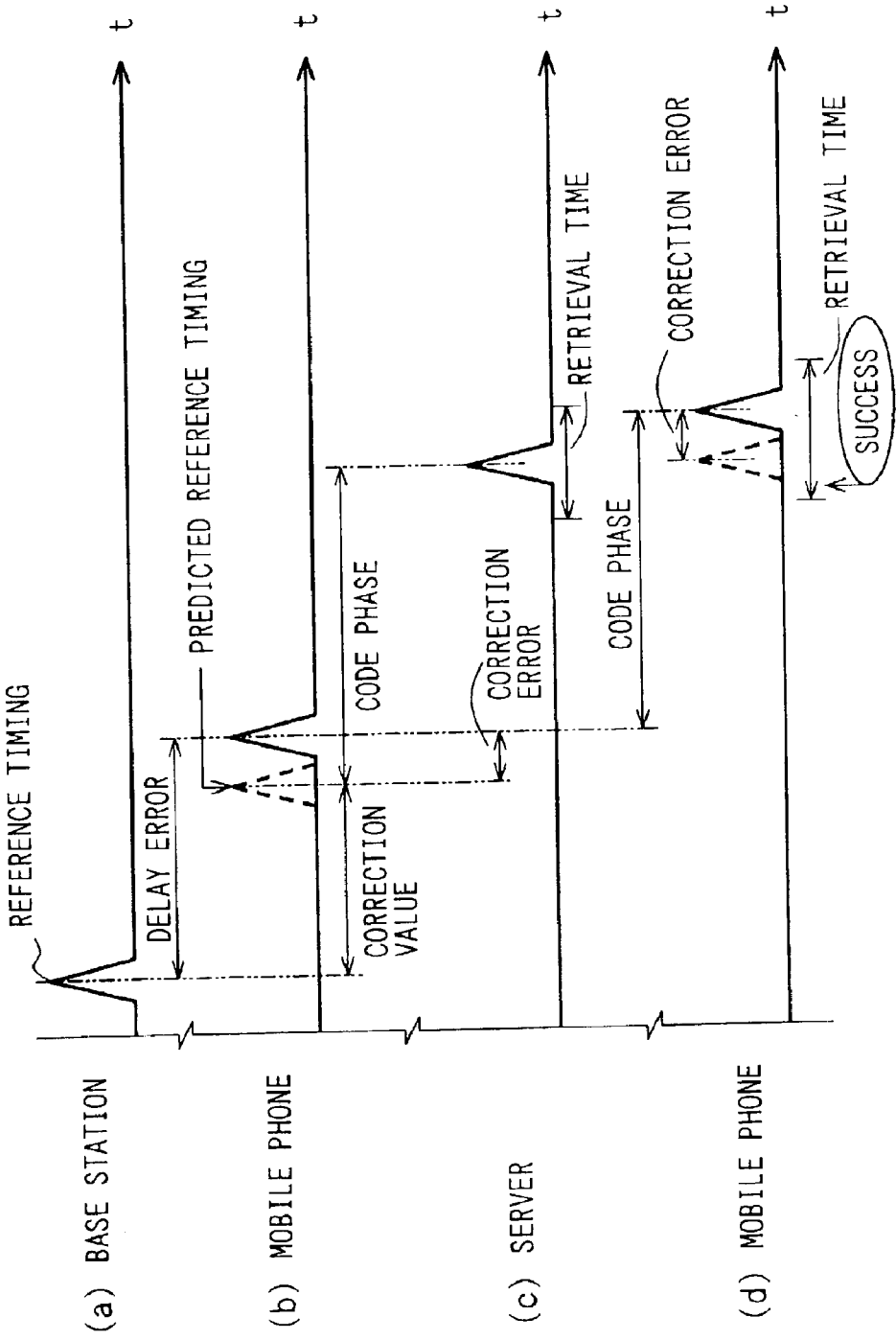
FIG. 18 is a time chart for describing the relationship between the retrieval timing and the retrieval time in a position specifying system according to a background art.
Figure 19:
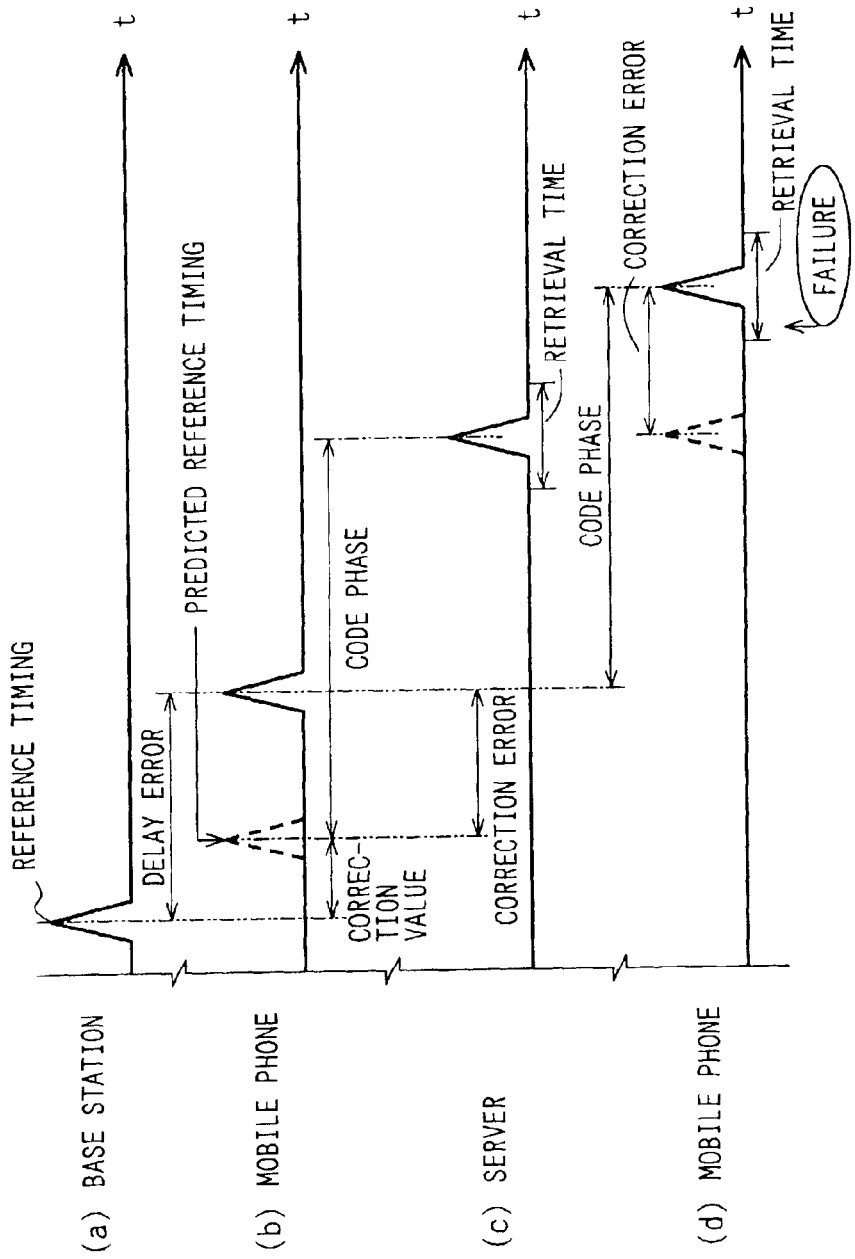
FIG. 19 is a time chart for describing the relationship between the retrieval timing and the retrieval time, corresponding to that of FIG. 18, in the conventional position specifying system according to the background art.

Also, as shown in FIG. 17, in a case that the mobile phone 1 corrects the search window from "4 (chip)" to "80 (chip)" to set the corrected search window with respect to the GPS satellite 5 having the satellite number "4" to which the index "1" has been applied; next, the mobile phone 1 corrects the search window from "2 (chip)" to, for example, "40 (chip)" with respect to the GPS satellite 5 having the satellite number "22" to which the index "2" has been applied; next, the mobile phone 1 corrects the search window from "4 (chip)" to, for example, "40 (chip)" with respect to the GPS satellite 5 having the satellite number "17" to which the index "3" has been applied; subsequently, the mobile phone 1 sets a parameter without any correction with respect to the GPS satellite 5 having the satellite number "8" to which the index "4" has been applied; next, the mobile phone 1 corrects the search window from "65 (chip)" to, for example, "100 (chip)" with respect to the GPS satellite 5 having the satellite number "31" to which the index "5" has been applied; and also next, the mobile phone 1 corrects the search window from "80 (chip)" to, for example, "120 (chip)" with respect to the GPS satellite 5 having the satellite number "5" to which the index "6" has been applied.

The mobile phone 1 may calculate "180 (milliseconds)" as the total retrieval time based upon the relationship between the search window and retrieval time shown in FIG. 7, although the total retrieval time does not reach the defined correction number. As a consequence, since the count value of the parameter correction counter may reach the defined correction number, the mobile phone 1 subsequently sets the parameter without any correction.

The above explanations are related to the case that the item (1): only the search window is corrected to be set among the above items (1) to (3) has been exemplified as the mode in which the mobile phone 1 corrects the parameter to set this corrected parameter. Alternatively, in the case that the item (2): only the code phase is corrected to be set, since the search window is not corrected to be set, the total retrieval time is not increased. Also, in the case that the item (3): both the search window and the code phase are corrected to be set, since the search window is corrected to set, the total retrieval time is increased. However, since the code phase is also corrected to be set, the degree of this increased total retrieval time is smaller than that obtained in the case that search window only is corrected.

When the incremented index exceeds the number of GPS satellites 5 notified from the position information server 4 ("YES" in step S317), the mobile phone 1 again sets "1" to this incremented index (step S320), and sets "0" to a retrieval success counter (step S321). In this case, a count value of this retrieval success counter corresponds to a total number of GPS satellites 5 which can succeed in retrieving operation.

Next, the mobile phone 1 retrieves such GPS satellites 5 which are instructed by the index at this time (step S322). At this time, if the mobile phone 1 has so far corrected the parameter to set the corrected parameter by executing the above process operation, then the mobile phone 1 retrieves the GPS satellites 5 based upon this corrected and set parameter. To the contrary, if the mobile phone 1 has set the parameter without any correction, then the mobile phone 1 retrieves the GPS satellites 5 based upon this set parameter without being corrected, namely, a parameter which is set by the position information server 4.

Subsequently, the mobile phone 1 determines whether this mobile phone 1 can succeed in the retrieving operation of the GPS satellites 5 (step S323). If the mobile phone 1 can succeed in the retrieving operation of the GPS satellites 5 ("YES" in step S323), then the mobile phone 1 increments the count value of the retrieval success counter (step S324), and compares the incremented count value of the retrieval success counter with a defined retrieval success number in order to determine whether the increment count value of the retrieval success counter reaches this defined retrieval success number (step S325). In this case, this defined retrieval success number corresponds to a total number of such GPS satellites 5 required for the retrieve operation by the position information server 4 which can succeed in specifying of the present position of the mobile phone 1.

Then, when the incremented count value of the retrieval success counter reaches the defined retrieval success number ("NO" in step S325), the mobile phone 1 subsequently ceases retrieving of the GPS satellites 5, and advances to the next process operation.

To the contrary, if the incremented count value of the retrieval success counter does not reach the defined retrieval success number ("YES" in step S325), the mobile phone 1 increments the index (step S326), and also compares the incremented index with the number of the GPS satellites 5 notified from the position information server 4 in order to determine whether this incremented index exceeds the number of the GPS satellites 5 notified form the position information server 4 (step S327). Then, when the incremented index does not exceed the number of the GPS satellites notified from the position information server 4 ("NO" in step S327), the mobile phone 1 again executes the process operations defined after the above step S322.

As previously explained, until the count value of the retrieval success counter reaches the defined retrieval success number, the mobile phone 1 retrieves the respective GPS satellites 5 notified from the position information server 4 so as to acquire the GPS satellite information related to the GPS satellites 5. When the count value of the retrieval success counter reaches the defined retrieval success number, the mobile phone 1 subsequently ceases retrieving of the GPS satellites 5.

Also, in a case that although the mobile phone 1 has retrieved all of the GPS satellites 5 notified from the position information server 4, the count value of the retrieval success counter does not reach the defined retrieval success number ("YES" in step S327), this mobile phone 1 again corrects such a parameter set to any one of the GPS satellites 5 and then again sets this corrected parameter. Based upon this corrected/set parameter, the mobile phone 1 again retrieves the GPS satellites 5 (step S328).

Next, when the mobile phone 1 acquires the GPS satellite information in accordance with the above manner, the mobile phone 1 retrieves nearby base stations so as to acquire nearby base station information related to the nearby base stations (step S106). Then, the mobile phone 1 transmits the GPS satellite information and the nearby base station information to the position information server 4.

When the position information server 4 receives both the GPS satellite information and the nearby base station information from the mobile phone 1, the position information server 4 executes the positioning calculation based upon the received GPS satellite information and the received nearby base station information (step S205) so as to specify a present position of this mobile phone 1, and then, transmits a positioning result indicative of this specified present position to the mobile phone 1. Then, when the mobile phone 1 receives the positioning result from the position information server 4, the mobile phone 1 displays this received positioning result on the display unit 13.

As previously explained, in accordance with this embodiment, in the mobile phone 1, at least one parameter of both the code phase indicative of the retrieval timing and the search window representative of the retrieval time, which are received from the position information server 4, is corrected to be set in such a manner that either this retrieval timing is moved or this retrieval time is prolonged. The mobile phone 1 retrieves the GPS satellites 5 so as to acquire the GPS satellite information based upon both the retrieval timing and the retrieval time, which have been corrected to be set, and then transmits this acquired GPS satellite information to the position information server 4.

As a consequence, even in a case that the time difference between the actual reference timing of the mobile phone 1 and the reference timing of the mobile phone 1 predicted by the position information server 4 is large, namely the correction error is large, at least any one of the retrieval timing and the retrieval time is corrected to be set in such a manner that either this retrieval timing is moved, or this retrieval time is prolonged. As a result, it is possible to avoid that the retrieval timing set by the position information server 4 deviates from the retrieval time during which the mobile phone 1 actually retrieves the GPS satellites 5. As a result, the possibilities at which the mobile phone 1 can succeed in the retrieving operation of the GPS satellites can be increased, and also, the possibilities at which the position information server 4 can properly specify the present position of the mobile phone 1 can be increased.

Also, the position specifying system is arranged as follows. That is, all of the GPS satellites 5 notified from the position information server 4 are sorted in the order of higher elevation angles, and at least any one of the retrieval timing and the retrieval time, which are related to the GPS satellites 5 notified from the position information server 4, is corrected to be set in the order of the higher elevation angles. As a result, the higher the elevation angle of the GPS satellite 5 is, the less the adverse influence is caused by a shielding article and the like. Thus, such GPS satellites 5 may own higher reliability. Therefore, since any one of the retrieval timing and the retrieval time related to the GPS satellite 5 having the higher reliability is corrected to be set at a top priority, the precision achieved when the position information server 4 specifies the present position of the mobile phone 1 can be improved.

Also, the position specifying system is arranged as follows. That is, the total retrieval time required to retrieve all of the GPS satellites 5 is calculated based upon the retrieval time set with respect to the respective GPS satellites 5, when this total retrieval time reaches the defined retrieval time, both the retrieval timing and the retrieval time, which are related to other GPS satellites 5 notified from the position information server 4, are set without any corrections thereof. Since such an optimum time required to retrieve all of the GPS satellites 5 is set as the defined retrieval time, at least any one of the retrieval timing and the retrieval time can be corrected to be set within a range which does not exceed this optimum time, and then the system can set the corrected retrieval timing, or the corrected retrieval time, the GPS satellites 5 can be effectively retrieved by the mobile phone 1.

Furthermore, the position specifying system is arranged as follows. That is, when the total number of the GPS satellites 5 in which at least any one of the retrieval timing and the retrieval time has been corrected to be set reaches the defined correction number, both the retrieval timing and the retrieval time are set without any corrections thereof, which are related to other GPS satellites 5 subsequently notified from the position information server 4. Accordingly, since an optimum number of the GPS satellites 5 in which at least any one of the retrieval timing and the retrieval time should be corrected is set as the defined correction number, at least any one of the retrieval timing and the retrieval time can be corrected within such a range which does not exceed this optimum number, and then the system can set the corrected retrieval timing, or the corrected retrieval time, so that the GPS satellites 5 can be effectively retrieved by the mobile phone 1.

The present invention is not limited only to the above embodiments, but may be modified in various ways.

The radio communication terminal may be realized by a mobile information terminal and the like, which own a communication function.

The base station may be realized by a base station having a function of a position information server. The position information server may be arranged in such a manner that a positioning calculation is performed based upon only the GPS satellite information so as to specify the present position of the mobile phone. The defined retrieval time, the defined correction number, and the defined retrieval success number may be set in accordance with a mode and the like of a system.

The mobile phone may alternatively determine whether such a parameter should be corrected with respect only to a GPS satellite to which an index preceding to a predetermined index has been applied. Also, since the mobile phone determines an elevation angle of a GPS satellite, the mobile phone may alternatively determine whether such a parameter should be corrected with respect only to a GPS satellite whose elevation angle reaches a predetermined elevation angle.

In the mobile phone, the computer program executed by the CPU is not limited only to such a computer program which has been previously stored in the beginning (for instance, at stage of manufacture), but also, may be realized by a computer program which is downloaded via a network from, for example, a specific server. Alternatively, this computer program may be realized by such a computer program which is transferred from a recording medium, for example, a CD-ROM (Compact Disk-Read-Only Memory) and a memory card to be installed.

What is claimed is:

1. A radio communication terminal for a position specifying system including a base station, a position information server and GPS satellites, the radio communication terminal comprising:

means for receiving, from the position information server through one communication base station, both retrieval timing and retrieval time that have been set with respect to each of the GPS satellites by the position information server; and means for transmitting at least GPS satellite information to the position information server so that the position information server specifies a position of the radio communication terminal based upon the received information, the radio communication terminal further comprising:

means for correcting at least any one of the retrieval timing and the retrieval time, which are related to the GPS satellites notified from the position information server, in such a manner that the retrieval timing is moved or the retrieval time is prolonged, and means for retrieving the GPS satellites based upon the corrected retrieval timing and retrieval time to acquire the GPS satellite information so that the acquired GPS satellite information is transmitted to the position information' server via the communication base station, wherein the correcting means sorts the GPS satellites notified from the position information server in the order of higher elevation angles, and corrects at least any one of the retrieval timing and the retrieval time, which are related to the GPS satellites notified from the position information server, in the order of the higher elevation angles of the GPS satellites.

2. A radio communication terminal as in claim 1, wherein the correcting means corrects the retrieval timing related to the GPS satellite notified from the position information server so that the retrieval time related to the GPS satellite is time-sequentially prolonged only in one direction.

3. A radio communication terminal as in claim 1, wherein the retrieving means ceases retrieving of other GPS satellites after a total number of GPS satellites which could be successfully retrieved reaches a defined retrieval success number.

4. A radio communication terminal as in claim 3, wherein the correcting means corrects at least any one of the corrected retrieval timing and the corrected retrieval time after a total number of GPS satellites which could be successfully retrieved does not reach the defined retrieval success number.

5. A radio communication terminal as in claim 1, further comprising:

means for displaying the position specified by and received from the position information server.

6. A radio communication terminal for a position specifying system including a base station, a position information server and GPS satellites, the radio communication terminal comprising:

means for receiving, from the position information server through one communication base station, both retrieval timing and retrieval time that have been set with respect to each of the GPS satellites by the position information server; and means for transmitting at least GPS satellite information to the position information server so that the position information server specifies a position of the radio communication terminal based upon the received information, the radio communication terminal further comprising:

means for correcting at least any one of the retrieval timing and the retrieval time, which are related to the GPS satellites notified from the position information server, in such a manner that the retrieval timing is moved or the retrieval time is prolonged, and means for retrieving the GPS satellites based upon the corrected retrieval timing and retrieval time to acquire the GPS satellite information so that the acquired GPS satellite information is transmitted to the position information server via the communication base station, wherein the correcting means calculates a total retrieval time required to retrieve all of the GPS satellites based upon the retrieval time set with respect to the respective GPS satellites, and sets both the retrieval timing and the retrieval time, which are related to other GPS satellites notified from the position information server without any correction thereof after the calculated total retrieval time reaches a defined retrieval time.

7. A radio communication terminal as in claim 6, wherein the correcting means corrects the retrieval timing related to the GPS satellite notified from the position information server so that the retrieval time related to the GPS satellite is time-sequentially prolonged only in one direction.

8. Radio communication terminal as in claim 6, wherein the retrieving means ceases retrieving of other GPS satellites after a total number of GPS satellites which could be successfully retrieved reaches a defined retrieval success number.

9. A radio communication terminal as in claim 6, wherein the correcting means corrects at least any one of the corrected retrieval timing and the corrected retrieval time after a total number of GPS satellites which could be successfully retrieved does not reach the defined retrieval success number.

10. A radio communication terminal as in claim 6, further comprising:

means for displaying the position specified by and received from the position information server.

11. A radio communication terminal for a position specifying system including a base station, a position information server and GPS satellites, the radio communication terminal comprising:

means for receiving, from the position information server through one communication base station, both retrieval timing and retrieval time that have been set with respect to each of the GPS satellites by the position information server; and means for transmitting at least GPS satellite information to the position information server so that the position information server specifies a position of the radio communication terminal based upon the received information, the radio communication terminal further comprising:

means for correcting at least any one of the retrieval timing and the retrieval time, which are related to the GPS satellites notified from the position information server, in such a manner that the retrieval timing is moved or the retrieval time is prolonged, and means for retrieving the GPS satellites based upon the corrected retrieval timing and retrieval time to acquire the GPS satellite information so that the acquired GPS satellite information is transmitted to the position information server via the communication base station, wherein the correcting means sets the retrieval timing and the retrieval time, which are related to other GPS satellites notified from the position information server without any correction thereof, after a total number of the GPS satellites in which at least any one of the retrieval timing and the retrieval time has been corrected reaches a defined correction number.

12. A radio communication terminal as in claim 11, wherein the correcting means corrects the retrieval timing related to the GPS satellite notified from the position information server so that the retrieval time related to the GPS satellite is time-sequentially prolonged only in one direction.

13. A radio communication terminal as in claim 11, wherein the retrieving means ceases retrieving of other GPS satellites after a total number of GPS satellites which could be successfully retrieved reaches a defined retrieval success number.

14. A radio communication terminal as in claim 11, wherein the correcting means corrects at least any one of the corrected retrieval timing and the corrected retrieval time after a total number of GPS satellites which could be successfully retrieved does not reach the defined retrieval success number.

15. A radio communication terminal as in claim 11, further comprising:

means for displaying the position specified by and received from the position information server.

* * * * *